(12) United States Patent
Barber

(10) Patent No.: US 8,109,727 B2
(45) Date of Patent: Feb. 7, 2012

(54) WIND TURBINE

(76) Inventor: Gerald L. Barber, Greenville, SC (US)

(*) Notice: Subject to any disclaimer, the term of this patent is extended or adjusted under 35 U.S.C. 154(b) by 179 days.

(21) Appl. No.: 12/426,494

(22) Filed: Apr. 20, 2009

(65) Prior Publication Data
US 2010/0266412 A1 Oct. 21, 2010

(51) Int. Cl.
F01D 5/24 (2006.01)

(52) U.S. Cl. ............ 416/132 B; 416/155; 416/205; 416/224

(58) Field of Classification Search .......... 415/4.3, 415/4.5; 416/132 A, 132 B, 155, 205, 224; 290/44, 55
See application file for complete search history.

(56) References Cited

U.S. PATENT DOCUMENTS

| 1,417,000 | A | * | 5/1922  | Vogt et al. ............ 416/132 R |
| 1,915,689 | A |   | 8/1932  | Moore |
| 3,874,816 | A | * | 4/1975  | Sweeney et al. ........ 416/139 |
| 3,912,937 | A |   | 10/1975 | Lesser |
| 3,995,170 | A |   | 11/1976 | Graybill |
| 4,003,676 | A |   | 1/1977  | Sweeney et al. |
| 4,049,362 | A | * | 9/1977  | Rineer ................... 416/119 |
| 4,111,601 | A |   | 9/1978  | Richard |
| 4,150,301 | A |   | 4/1979  | Bergey, Jr. |
| 4,208,168 | A | * | 6/1980  | Chen et al. ............ 416/132 B |
| 4,319,865 | A |   | 3/1982  | Richard |
| 4,330,714 | A |   | 5/1982  | Smith |
| 4,350,895 | A |   | 9/1982  | Cook |
| 4,364,708 | A |   | 12/1982 | David |
| 4,417,853 | A |   | 11/1983 | Cook |
| 4,491,739 | A |   | 1/1985  | Watson |
| 4,494,007 | A |   | 1/1985  | Gaston |
| 4,545,729 | A | * | 10/1985 | Storm ................... 416/132 B |
| 4,619,585 | A |   | 10/1986 | Storm |
| 4,720,640 | A |   | 1/1988  | Anderson et al. |
| 4,729,716 | A |   | 3/1988  | Schmidt |
| 4,764,313 | A |   | 8/1988  | Cameron et al. |
| 4,832,571 | A | * | 5/1989  | Carrol ................... 416/132 B |

(Continued)

FOREIGN PATENT DOCUMENTS

EP 0015131 9/1980

(Continued)

OTHER PUBLICATIONS

International Search Report and Written Opinion dated Jun. 16, 2010.

(Continued)

Primary Examiner — Edward Look
Assistant Examiner — Sean J Younger
(74) Attorney, Agent, or Firm — Thomas, Kayden, Horstemeyer & Risley, LLP

(57) ABSTRACT

A wind turbine (20) includes a turbine wheel (22). Radially extending sailwing assemblies (30) are supported between the axle structure (28) and the perimeter rail (26) of the turbine wheel. The sailwing assemblies include sail end supports (52, 53), sail support cables (54, 55) extending between the sail end supports, and sailwings (58) that are supported by the sail support cables and extend between the axle structure (28) and the perimeter rail (26) of the turbine wheel. The sail end supports (52, 53) may be pivoted to form a pitch in the sailwings (58) and pivoted with respect to each other to form a twist in the sailwings, and sail spreader bars (70) may be mounted in the sailwings and connected to the sail support cables (54, 55) to adjust the effective width and loft of the sailwings.

17 Claims, 13 Drawing Sheets

U.S. PATENT DOCUMENTS

| | | | |
|---|---|---|---|
| 5,226,806 A * | 7/1993 | Lubbers | 416/132 B |
| 5,336,933 A * | 8/1994 | Ernster | 290/55 |
| 5,599,172 A | 2/1997 | McCabe | |
| 5,876,181 A | 3/1999 | Shin | |
| 6,015,258 A | 1/2000 | Taylor | |
| 6,064,123 A | 5/2000 | Gislason | |
| 6,091,161 A | 7/2000 | Dehlsen et al. | |
| 6,270,308 B1 | 8/2001 | Groppel | |
| 6,327,994 B1 * | 12/2001 | Labrador | 114/382 |
| 6,417,578 B1 | 7/2002 | Chapman et al. | |
| 6,836,028 B2 | 12/2004 | Northrup et al. | |
| 6,849,965 B2 | 2/2005 | Le Nabour et al. | |
| 6,951,443 B1 | 10/2005 | Blakemore | |
| 6,952,058 B2 * | 10/2005 | McCoin | 290/44 |
| 6,979,171 B2 | 12/2005 | Lauritsen | |
| 7,098,552 B2 * | 8/2006 | McCoin | 290/44 |
| 7,116,006 B2 * | 10/2006 | McCoin | 290/54 |
| 7,156,037 B2 | 1/2007 | Borgen | |
| 7,218,011 B2 | 5/2007 | Hiel et al. | |
| 7,323,792 B2 | 1/2008 | Sohn | |
| 7,331,762 B2 | 2/2008 | Fraenkel | |
| 7,358,624 B2 | 4/2008 | Bacon | |
| 7,371,135 B1 * | 5/2008 | Vanderhye et al. | 440/8 |
| 7,448,337 B1 * | 11/2008 | King | 114/102.1 |
| 7,766,601 B2 * | 8/2010 | Vida Marques | 415/4.2 |
| 2003/0168864 A1 | 9/2003 | Heronemus et al. | |
| 2003/0227174 A1 | 12/2003 | Bayly | |
| 2003/0235493 A1 | 12/2003 | Keyvani | |
| 2006/0012182 A1 | 1/2006 | McCoin | |
| 2006/0275121 A1 | 12/2006 | Merswolke et al. | |
| 2007/0013196 A1 | 1/2007 | Chen | |
| 2007/0024060 A1 | 2/2007 | Bacon | |
| 2007/0138798 A1 * | 6/2007 | McClintic | 290/44 |
| 2007/0166159 A1 | 7/2007 | Williams | |
| 2008/0003105 A1 | 1/2008 | Nies | |
| 2008/0042444 A1 | 2/2008 | Johnson | |
| 2008/0159873 A1 | 7/2008 | Tran | |
| 2008/0253892 A1 | 10/2008 | Dehlsen | |
| 2009/0096217 A1 | 4/2009 | Watson | |

FOREIGN PATENT DOCUMENTS

| | | | |
|---|---|---|---|
| GB | 2 100 688 A | | 1/1983 |
| JP | 11117850 A | * | 4/1999 |
| JP | 2004353637 A | * | 12/2004 |
| JP | 2009-030586 | | 12/2009 |
| WO | WO 03/046376 | | 6/2003 |

OTHER PUBLICATIONS

International Search Report and Written Opinion dated Jul. 2, 2010.
International Search Report and Written Opinion dated Jun. 30, 2010.
International Search Report and Written Opinion dated Jun. 15, 2010.
International Search Report and Written Opinion dated Jun. 18, 2010.

* cited by examiner

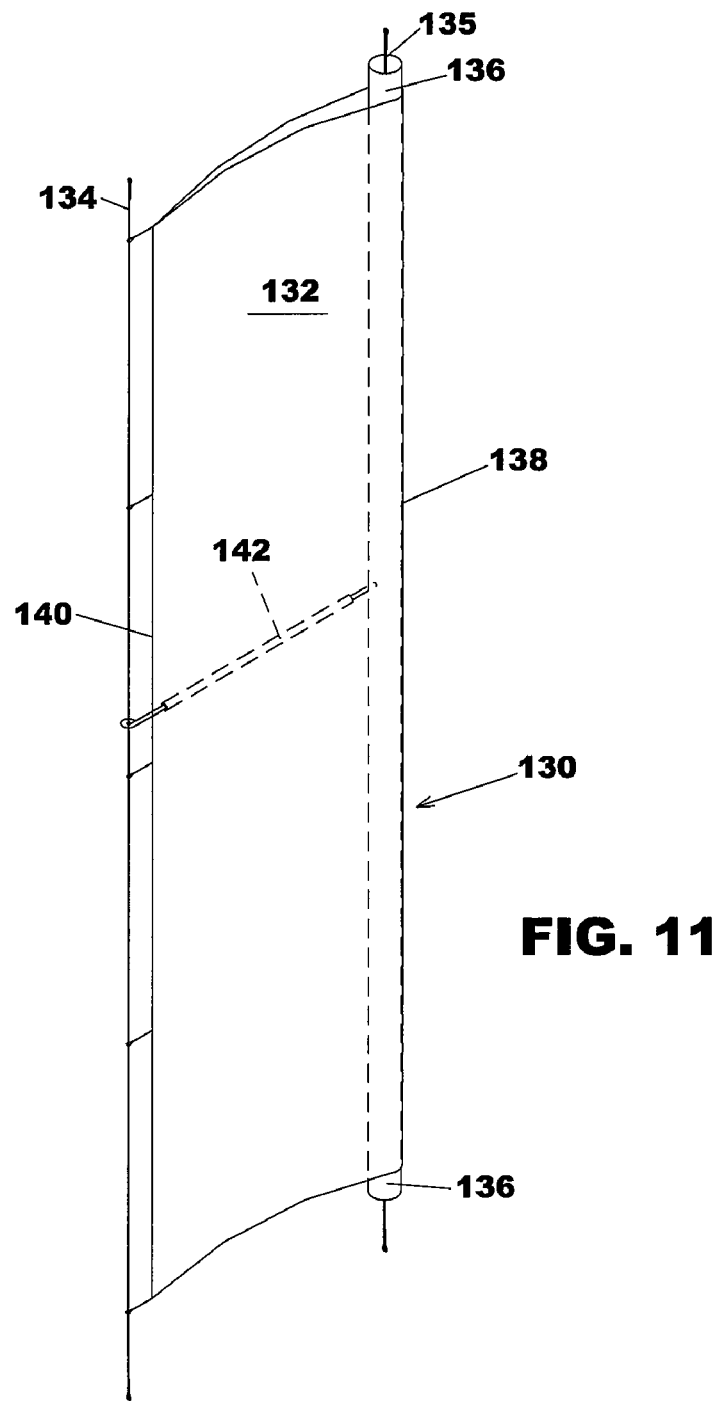
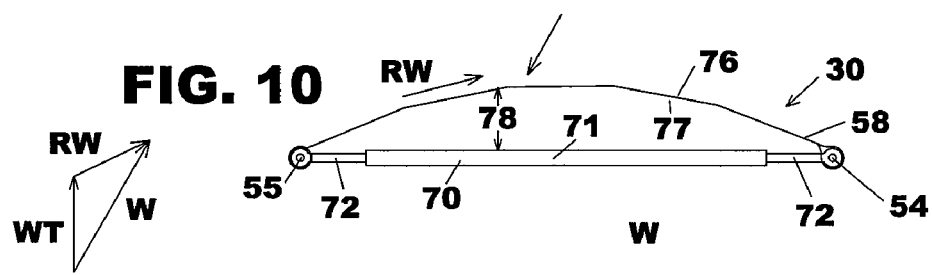

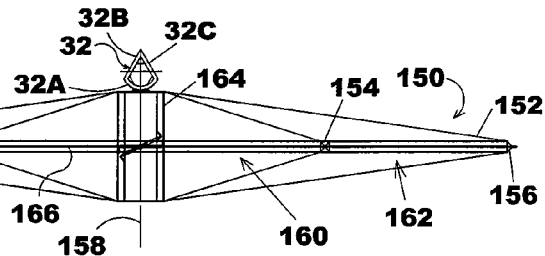
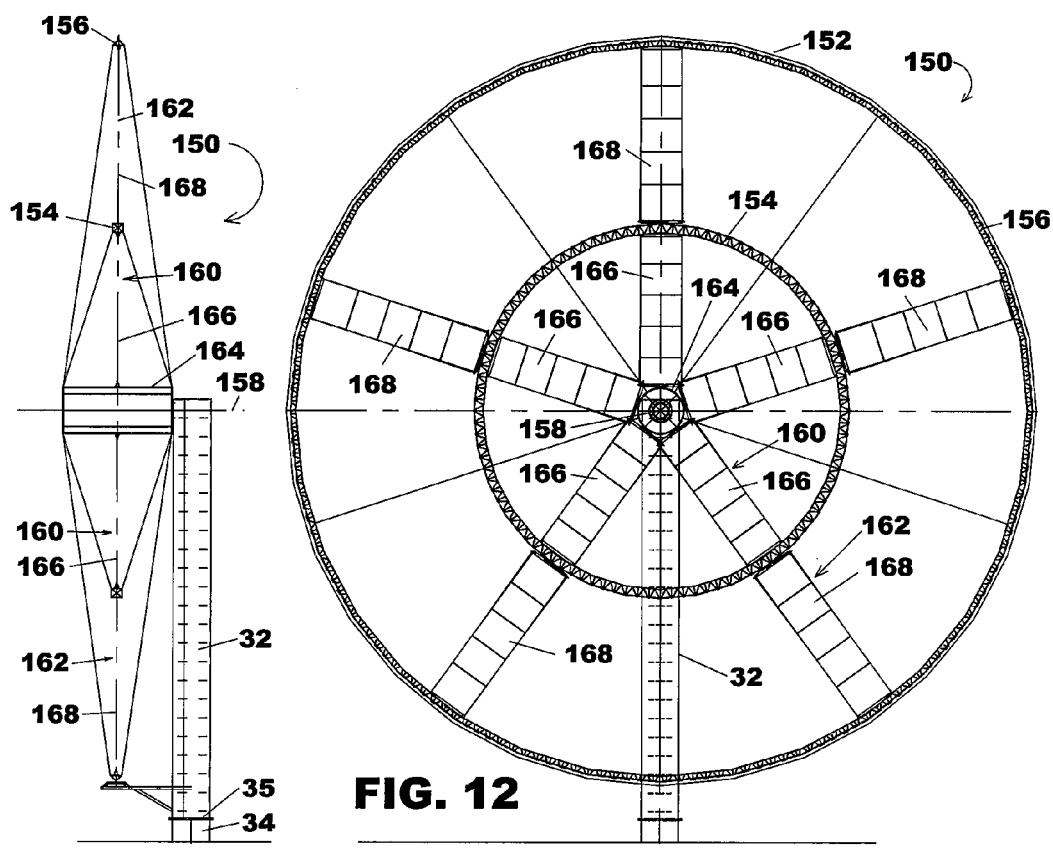
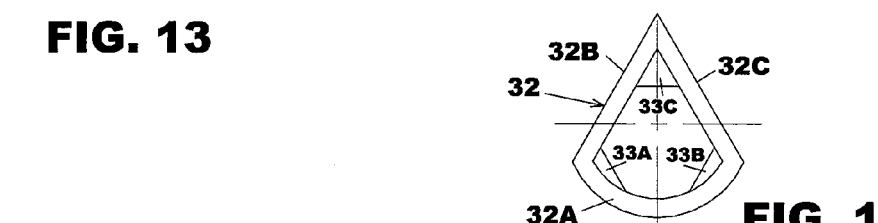
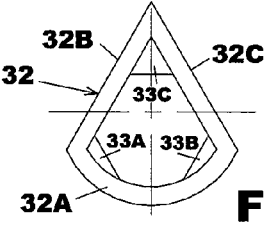
FIG. 14
FIG. 13
FIG. 12
FIG. 15

WIND TURBINE

FIELD OF THE INVENTION

This invention concerns a wind turbine for the generation of electricity that includes a turbine wheel rotatably mounted on a laterally extending central axis, with the perimeter of the turbine wheel driving a generator of electricity.

BACKGROUND OF THE INVENTION

Windmills have been used for many generations for the purpose of pumping water from the ground and for generating electricity. The basic advantage of the windmill is that it uses the power of the wind to rotate a wheel having radially extending blades that are driven by the wind. This rotary movement is converted into various useful purposes. For example, wind turbines in the form of propellers mounted on towers have been placed in areas where steady winds are prevalent and the wind turbines are used to generate electricity.

The blades of the conventional wind turbines are very large and made of expensive rigid material and are constructed to have the blades extend radially from a central hub, with no extra support at the outer tips of the blades. The conventional wind turbine blades rotate at a high rate of revolutions and must withstand both the centrifugal forces generated by the fast revolution of the blades and the cantilever bending forces applied to the blades by the wind. Since the outer portions of the blades move at a very high velocity and are engaged by strong winds, the larger the blades the stronger they must be and the more expensive they become. Thus, there is a practical limit as to the length and width of the blades because of the expense of stronger materials for larger blades.

Another type of wind turbine is one that has sail wings constructed of cloth that are a substitute for the rigid blades of the conventional wind turbines described above. For example U.S. Pat. Nos. 4,330,714, 4,350,895, and 4,729,716 disclose wind turbines that do not use rigid propeller blades but use sails that catch the wind. The sails are mounted on radiating spars of the turbine. These particular wind turbines include circular inner and outer rims with the sails of the turbine supported by both the inner and outer rims. The outer rim supports the outer portions of the sails so that the force of the wind applied to the sails may be absorbed to a major extent by the outer rim so there is little if any cantilever force applied to the sails. This allows the blades of the wind turbine to be formed of lighter weight material, material that is not required to bear as much stress in comparison to the typical free bladed turbine. However, the relative speed of the wind on a turbine wheel is greater near the outer portions of the blades of the turbine wheel in comparison with the inner portions of the blades, and the above noted patents do not teach adjustments for changing the pitch or twist of the cloth blades in a turbine wheel for compensating for different wind loads on different parts of the blades.

A feature in some of the prior art wind turbines is the means by which the speed of the turbine may be adjusted when the wind velocity changes. For example, some of the wind turbines may be turned away from facing directly into the wind during high speed winds. Others may increase the load applied by the electrical generator that is driven by the wind turbine. However, it is desirable that the load of the generator be maintained at a desired level, and it is desirable to avoid frequent changes in the direction in which the wind turbine faces.

Thus, it would be desirable to produce and use a wind turbine that includes an outer support rim for supporting light weight sailwings that may assume the approximate shape of an airfoil with shape control means for adjusting the shape of the airfoil and to form a preferred shape for wind conditions.

SUMMARY OF THE DISCLOSURE

Briefly described, this disclosure sets forth the features of a wind turbine that is powered by atmospheric wind and which can be used to create rotary energy that is transformed into an end product, such as to drive an electrical generator, to run a grist mill, or to pump water. The end use may vary in accordance with need, but a practical end use for the wind turbine is to create electricity by driving a generator.

In one form of the system the wind turbine includes a turbine wheel that is rotatably mounted on a support about a laterally extending central axis. A plurality of sailwing assemblies are carried by the turbine wheel, the sailwing assemblies each including a sail cloth extending radially from the central axis of the turbine wheel. Sail support cables extend substantially parallel to the longitudinal axis of the sail cloth, positioned adjacent and supporting the opposed side edges of the sail cloth.

Shape control means may be used for adjusting the attitude and shape of the sail cloth. The shape control means may include sail end supports attached to the opposed inner and outer ends of the sail cloth for rotating the opposed ends of the sail cloth for selectively imparting pitch and/or a longitudinal twist to the sail cloth. The shape control means also may include sail spreader bars positioned at intervals between the opposed ends of the sail cloth and attached at intervals along the support cables for adjusting the distance between the support cables. This adjusts the loft of the sail cloth in response to the wind movement across the sail cloth. Another shape control means may include the trim cables extending from the sail end supports to the cables for adjusting the configuration of the sail cloth.

The support of the wind turbine may comprise an upright tower with the turbine wheel rotatably mounted on the tower about a laterally extending central axis.

The turbine wheel may include an outer perimeter rail structure that may be used for both stabilizing and supporting the sailwings and for forming a rotor of a stator that together function as an electrical generator.

Also, the outer perimeter rail may be used to mechanically drive the rotor of a generator positioned adjacent the perimeter rail.

Other features and advantages of the structure disclosed herein may be understood from the following specification and accompanying drawings.

BRIEF DESCRIPTION OF THE DRAWINGS

FIG. 10 is a cross-sectional view of a sail cloth and one of its spreader bars.

FIG. 11 is a perspective illustration of a sailwing assembly having its sail cloth mounted at one edge about a spar.

FIG. 12 is front elevational view of a modified wind turbine, showing the turbine wheel with concentric sailwing assemblies.

FIG. 13 is a side elevational view of the wind turbine of FIG. 11.

FIG. 14 is a top view of the wind turbine of FIG. 11.

FIG. 15 is a cross section of the mast of FIG. 14, taken along lines 15-15 of FIG. 14.

DETAILED DESCRIPTION

Figure 1:
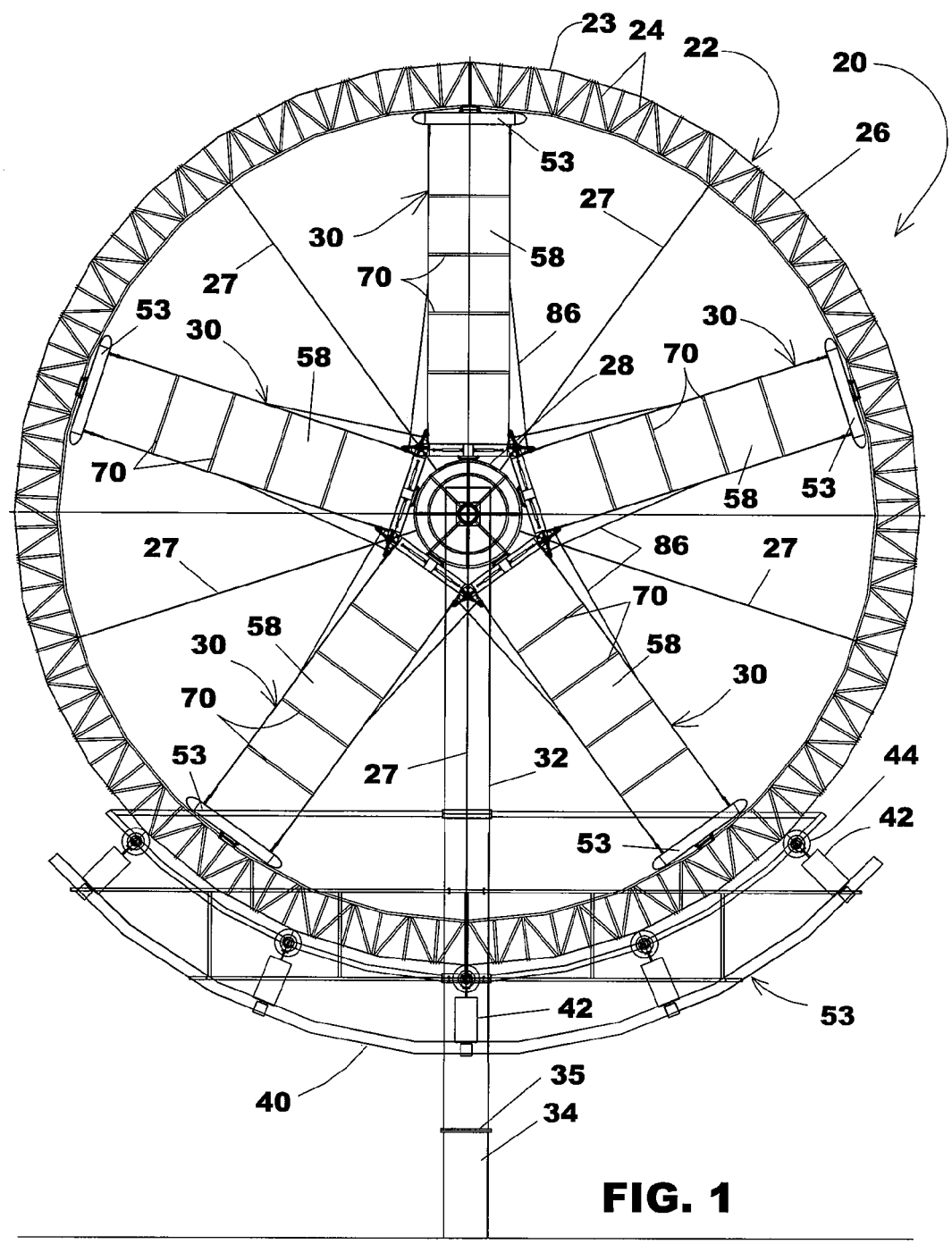
FIG. 1 is a front elevational view of the wind turbine.

Referring now in more detail to the drawings in which like numerals indicate like parts throughout the several views, FIG. 1 shows a wind turbine 20 that includes a turbine wheel 22 having an outer perimeter 23 formed by a series of angled braces 24 and a perimeter rail 26 that extends continuously about the turbine wheel. Axle structure 28 is at the center of the turbine wheel 22 and a plurality of sailwing assemblies 30 are mounted to the axle structure 28 and extend radially toward the angled braces 24 that form the perimeter of the turbine wheel.

The turbine wheel is mounted on a mast 32 and the mast is rotatably mounted on the ground support 34 by a yaw bearing 35. The mast 32 may be generally triangular in cross section, as shown in FIG. 15, with one rounded side 32A oriented perpendicular to the on-coming wind and flat converging side sides 32B and 32C directed rearwardly. Strengthening gussets 33A, 33B and 33C are mounted in the internal corners of the mast. This shape provides high bend resistance against the on-coming wind forces. A mechanism is provided (not shown) for rotating the mast 32 on its yaw bearing 35 with respect to the ground support 34 so as to turn the turbine wheel 22 into the wind.

FIG. 1 illustrates the power takeoff assembly 38 that is mounted to the mast 32 at the lower arc of the turbine wheel 22 for the purpose of extracting rotary energy from the turbine wheel. The power takeoff assembly 38 includes a cradle 40 that supports at least one electrical generator 42 and a drive wheel 44 that operates the electrical generator 42. The drive wheel 44 makes surface contact with the perimeter rail 26 so that when the turbine wheel 22 rotates, its perimeter rail 26 engages and rotates drive wheel 44, with the drive wheel 44 rotating the rotor of the electrical generator 42. In the embodiment shown in FIG. 1, there are five electrical generators and drive wheels mounted on the cradle 40. However, other numbers and combinations of items may be supported on the cradle 40.

The cradle 40 may be shaped in an arc that is concentric with respect to the perimeter rail 26 for supporting all of the electrical generators and their drive wheels in frictional contact with the perimeter rail. The cradle 40 may be supported by and revolve in unison with the mast 32.

The segments of the angle braces 24 and perimeter rail 26 are held in place on the rotating turbine wheel by radially extending cables 27 that extend from the axle structure 28 out to the angle braces 24.

Figure 2:
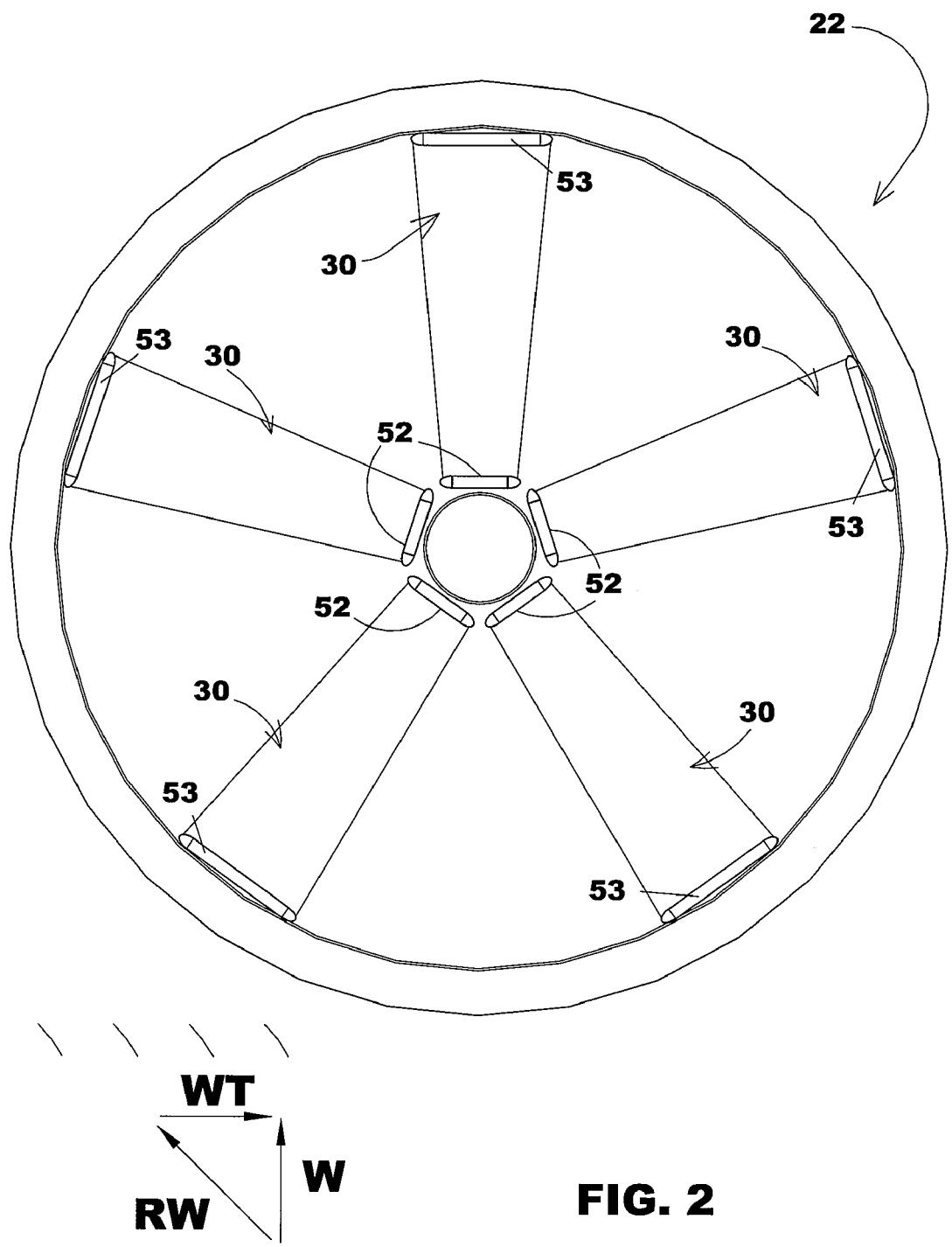
FIG. 2 is schematic illustration of the wind turbine of FIG. 1, except showing the sailwing assemblies angled for catching the wind that is used to rotate the wind turbine and each sailwing assembly formed with a longitudinal twist that is a deep pitch at the inner sailwing assembly and a shallow pitch at the outer end of the sailwing assembly.

FIG. 2 is a schematic illustration of the turbine wheel 22 that has its sailwing assemblies 30 twisted along their lengths to catch the available wind. It should be understood that the configuration of the sailwing assemblies of FIG. 1 are turned to face the viewer to show the shape of the sailwing assemblies, but in normal operating circumstances the sailwing assemblies will be twisted along their lengths to form a varied pitch as shown in FIG. 2.

FIG. 2 also shows the direction of the wind W compared with the direction of the wind turbine movement WT and the resulting direction of the relative wind RW as it meets the moving sailwing assemblies 30. Because the outer portions of the sailwing assemblies move faster than the inner portions, the relative wind is greater near the outer portions of the sailwing assemblies than near the inner portions thereof, so the sailwing assemblies may be formed with a varied pitch along their lengths that complements the relative wind.

Figure 3:
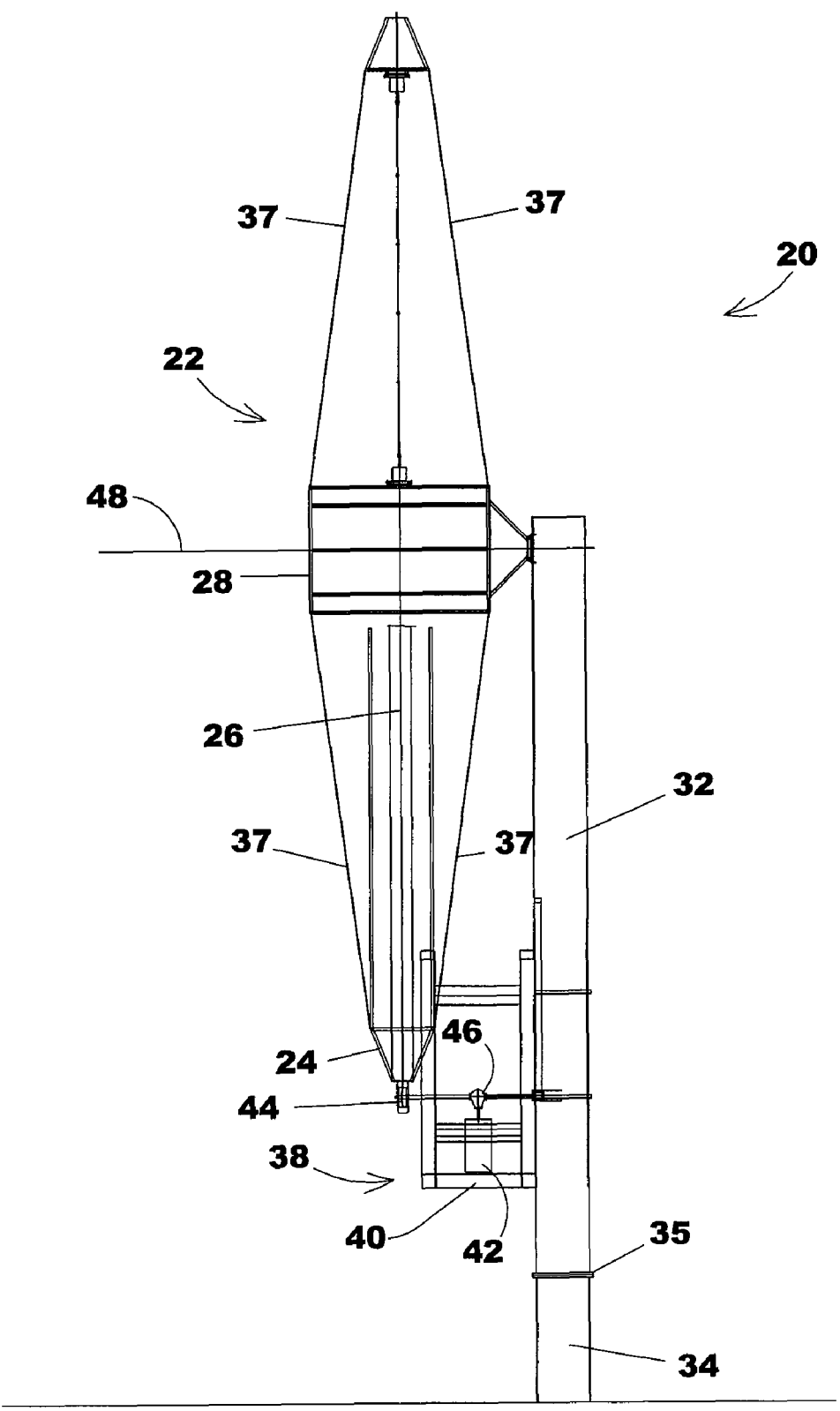
FIG. 3 is a side elevational view of the wind turbine.
Figure 4:
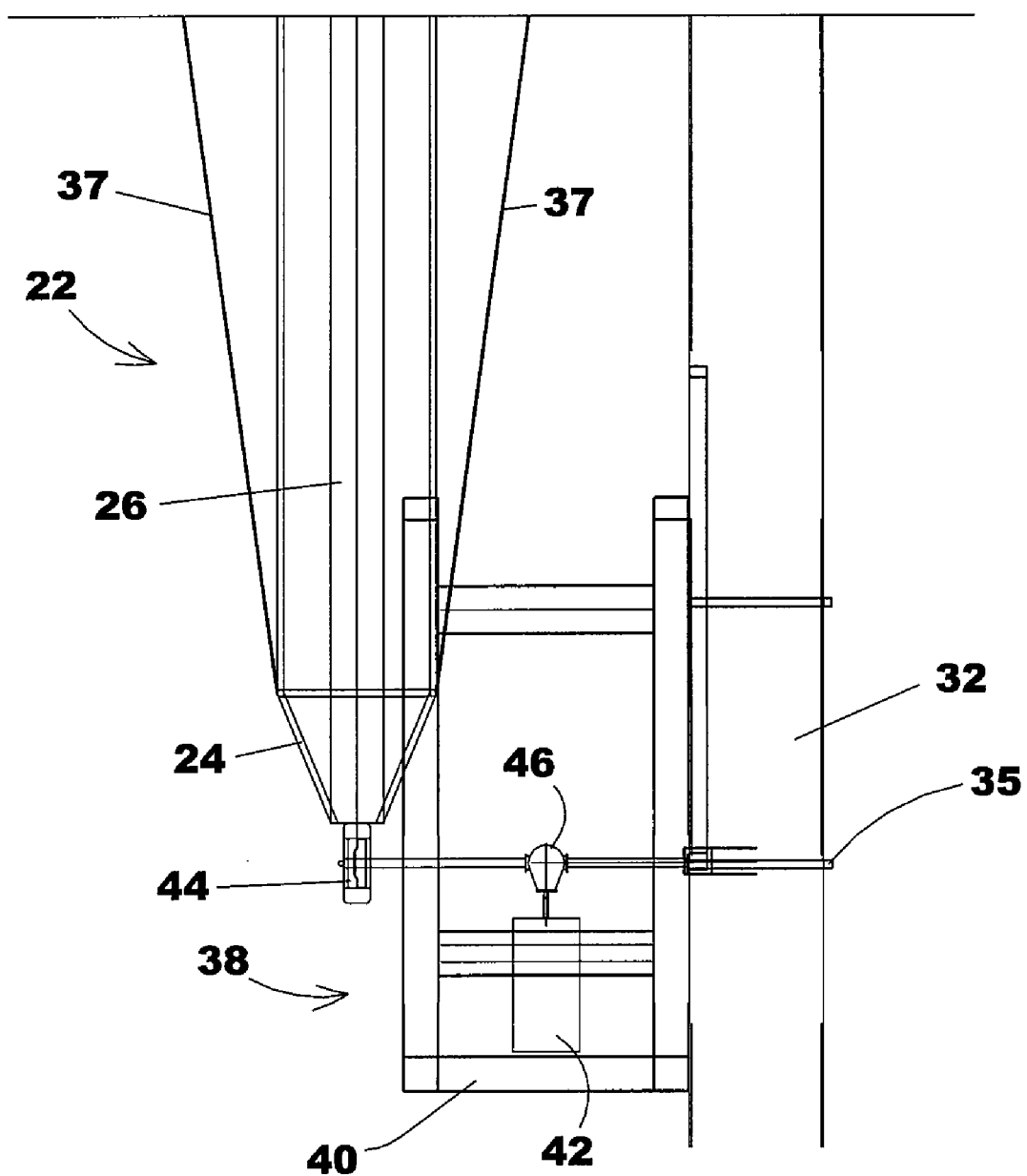
FIG. 4 is a detailed illustration of a section of the wind turbine as shown in FIG. 3.

FIGS. 3 and 4 show the side elevational view of the wind turbine 20. A gear assembly, such as a differential 46 on cradle 40, may be used to transmit the power from the drive wheel 44 that gauges the perimeter rail 26 to the electrical generator 42. A clutch (not shown) may be supported by the cradle 40 and used to selectively engage or disengage the link between the drive wheel and the generator. The cradle 40 is mounted to the mast 32 and the cradle and the turbine wheel 22 revolve in unison with the upright mast 32.

Figure 5:
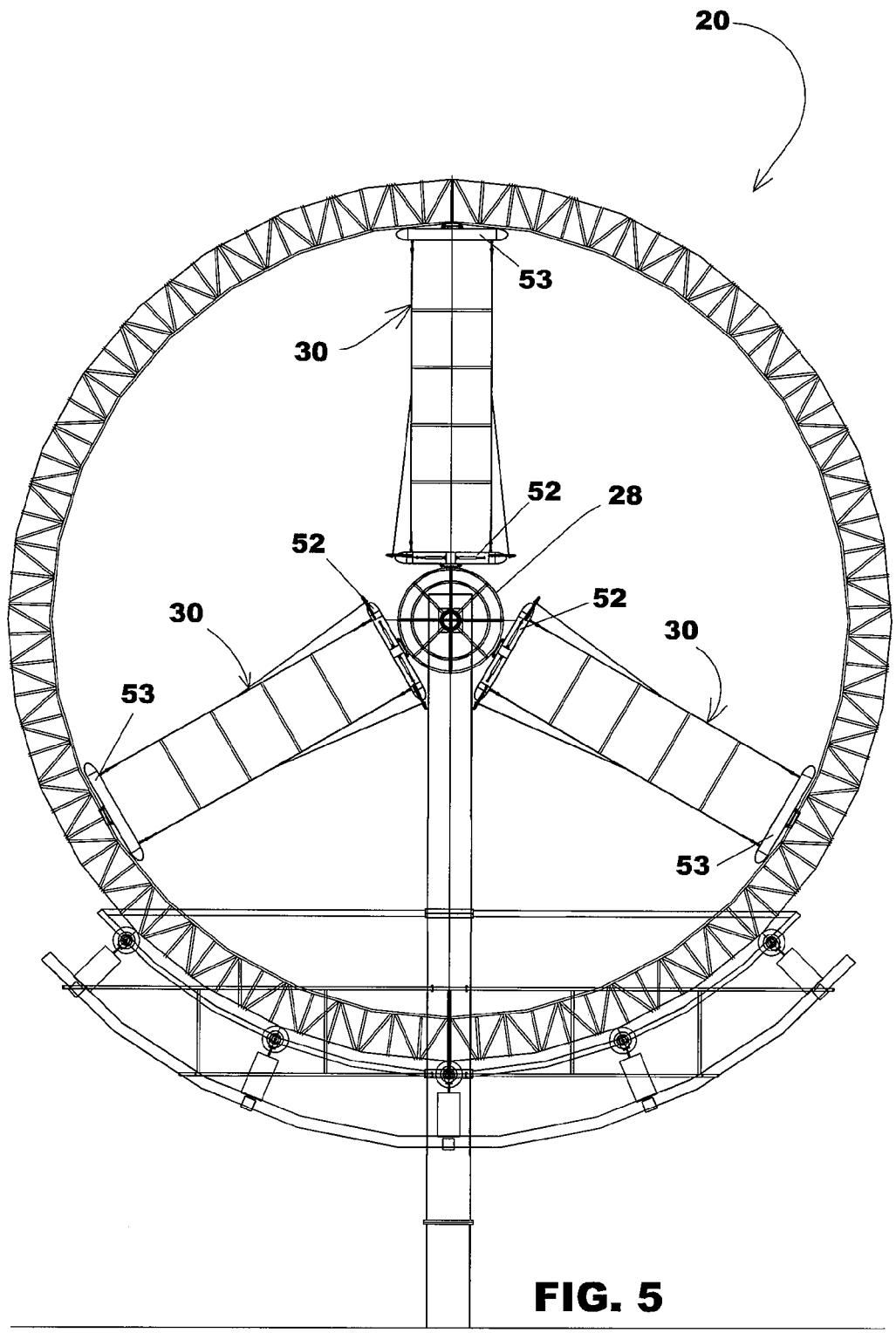
FIG. 5 is a front elevational view of a wind turbine, similar to FIG. 1 but showing a wind turbine having only three sailwing assemblies.

FIG. 5 shows a modified wind turbine 20 that has three sailwing assemblies 30 that are arranged at equal angles from one another and extend radially from the axle structure 28.

Figure 6:
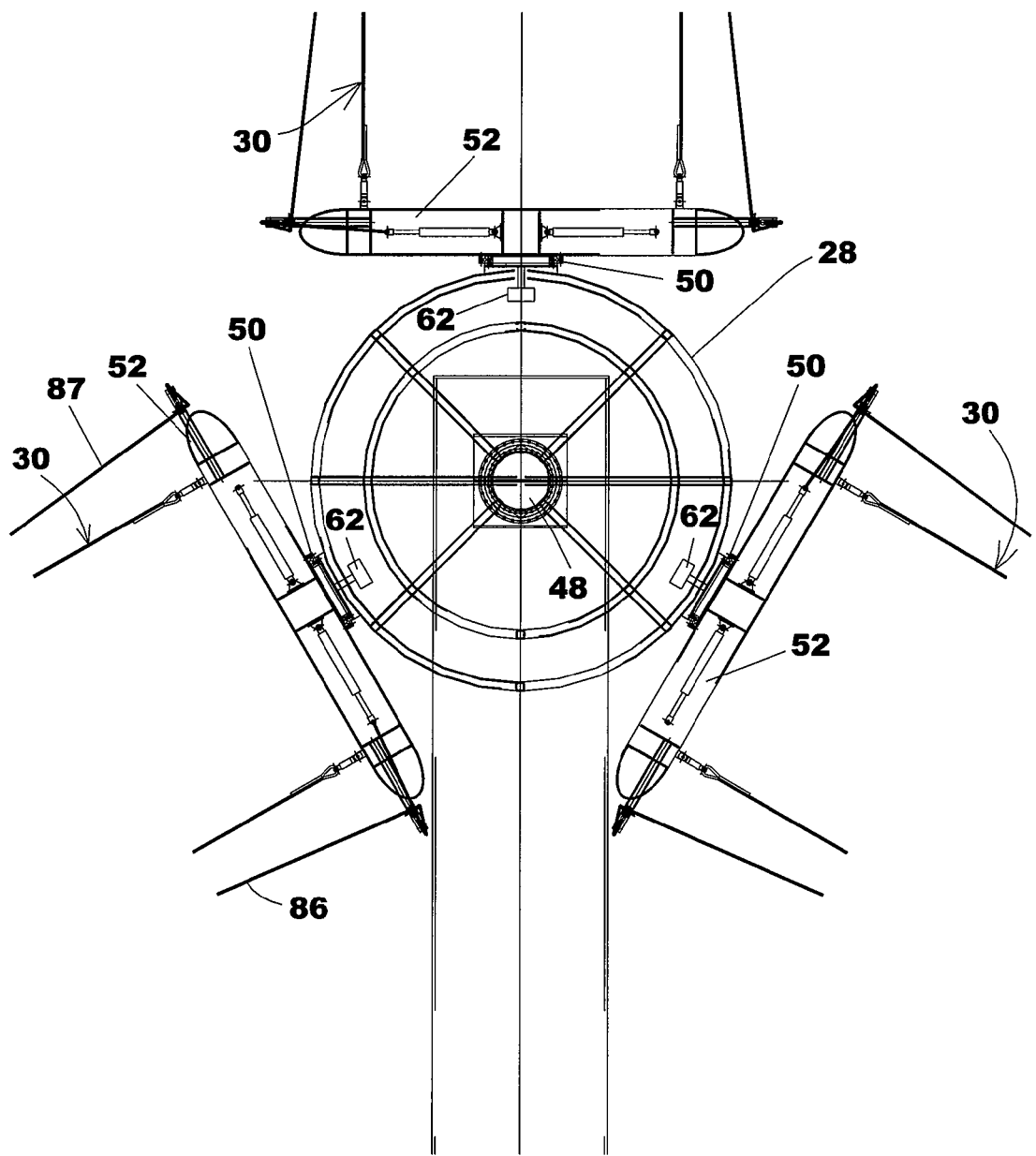
FIG. 6 is a front detail view of the wind turbine of FIG. 5, showing the axle and the adjacent portions of the sailwing assemblies.

FIG. 6 is a more detailed illustration of the axle structure 28 and the adjacent ends of the sailwing assemblies 30 of FIG. 5. The sailwing assemblies 30 revolve in unison with the axle structure 28 about a laterally extending axis of rotation 48 so that the sailwing assemblies 30 are in a common upright plane. When rotated at the same speed, the five bladed wind turbine of FIG. 1 has the ability to develop more force for operating more electrical generators 42 than the three bladed wind turbine of FIG. 5.

Figure 7:
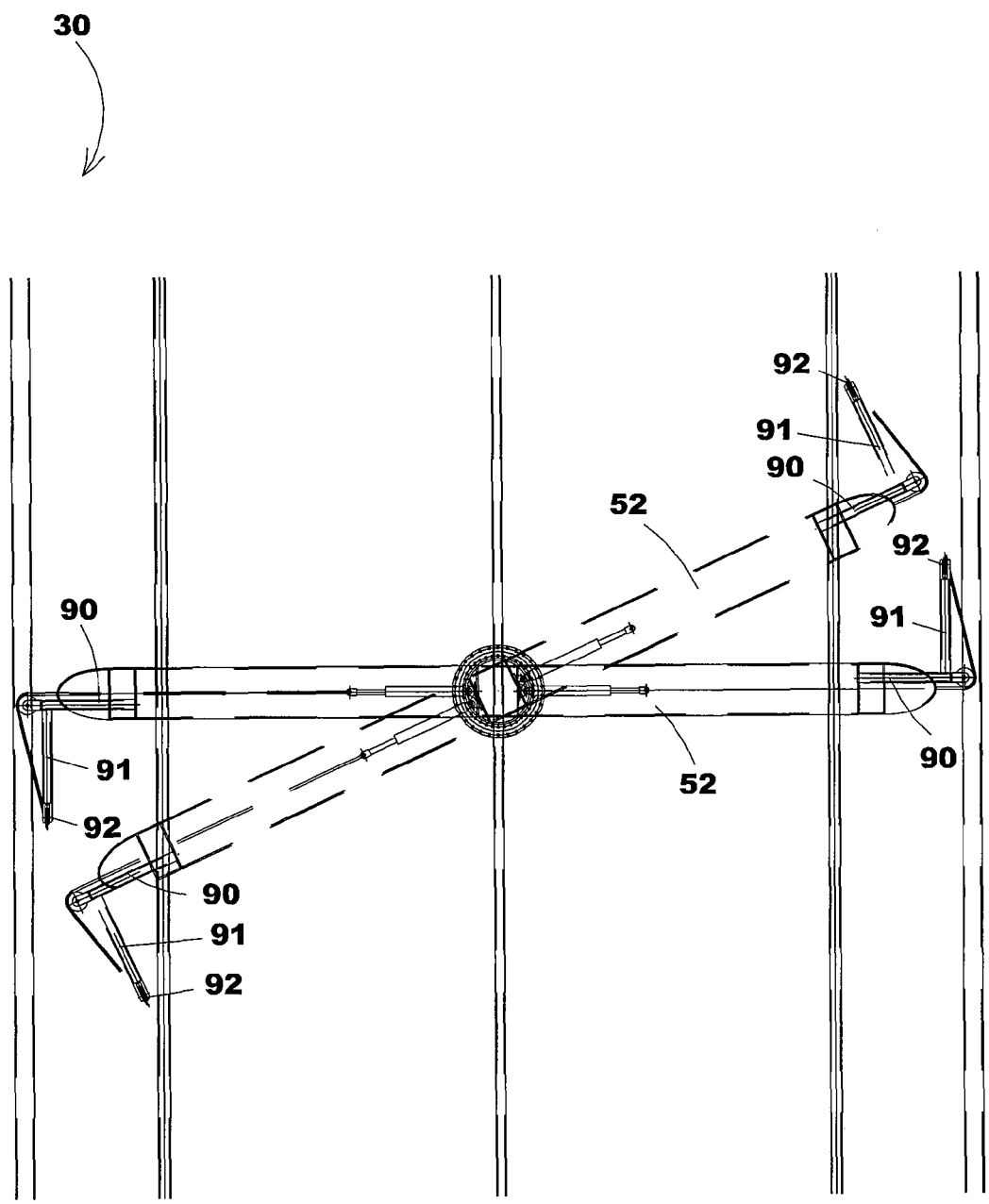
FIG. 7 is a detailed illustration of an inner sail end support and how it may be rotated.

FIG. 7 shows how an inner sail end support 52 may pivot to change the pitch or twist of the sailwing. For example, sail end support 52 may be pivoted from its full line position to its dash line position, indicating how the sail end supports may turn the inner end portions of the sail assemblies in the direction of the arrows, creating the twist or pitch in the sail assembly.

Figure 8:
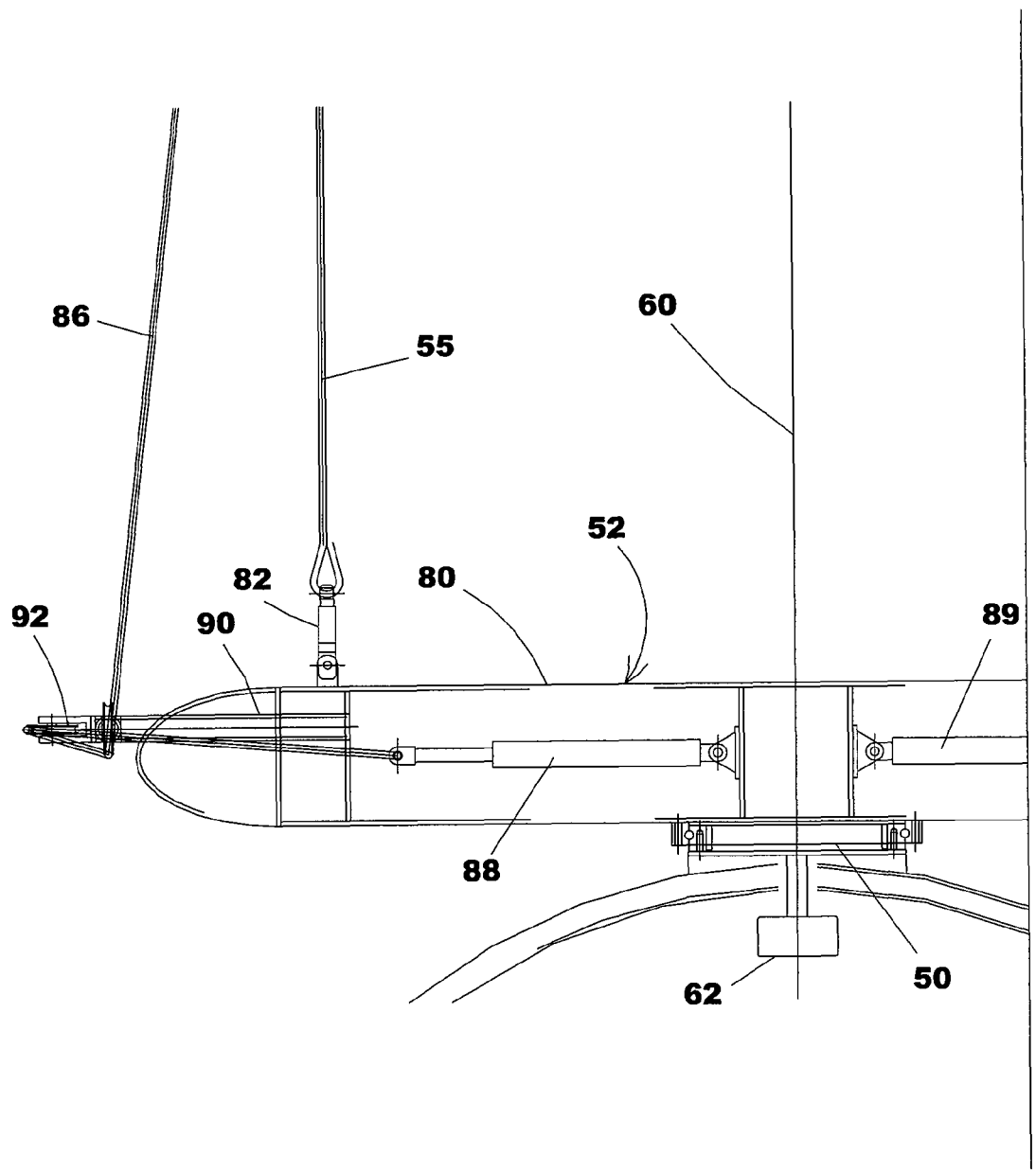
FIG. 8 is a detail of the inner sailwing support.

FIG. 8 shows more details of one of the sailwing assemblies 30. The sailwing assemblies each include inner and outer ring bearings known as slewing rings 50 and 51 (FIGS. 8 and 9A), inner and outer sail end supports 52 and 53, sail support cables 54 and 55, and a sail cloth 58. The outer sail end supports 53 may be longer or shorter than the inner sail end supports 52, if desired. The sail cloth is shown as being rectangular in FIG. 9A, but may be of other shapes, such as wedge shape with larger width at the outer portions than the inner portions, for example. Different sizes and shapes of sail cloth 58 may be used and may be supported by the sail support cables 54 and 55.

The stewing rings 50 and 51 are rotatable about longitudinal axis 60 by motors 62 (FIG. 8) so as to be able to turn their respective sail end supports 52 and 53 about the longitudinal axis 60 of the sailwing assembly. Slewing rings are available from Rotek, Inc., at www.rotek-inc.com. Motors are available from Teknic, Inc. at www.teknic.com. As shown in FIG. 8, an electrical turning motor 62 is mounted to each slewing ring 50 so as to rotate the inner sail end supports 52, between the full line position to the dash line position shown in FIG. 7. Similar motors (not shown) are mounted on the slewing rings 51 of the outer sail end supports 53 for independently rotating the outer sail end supports 53. The motors 62 may be independently operated so that the inner sail end support 52 moves independently of the outer sail end support 53 and so that the sail end supports may be oriented at different angles with respect to each other. This forms a twist in the sailwing about the longitudinal axis 60. An example of the different rotary positions of the inner and outer sail end supports for forming a twist in a sailwing assembly is shown in FIGS. 9B and 9C.

Figure 9A:
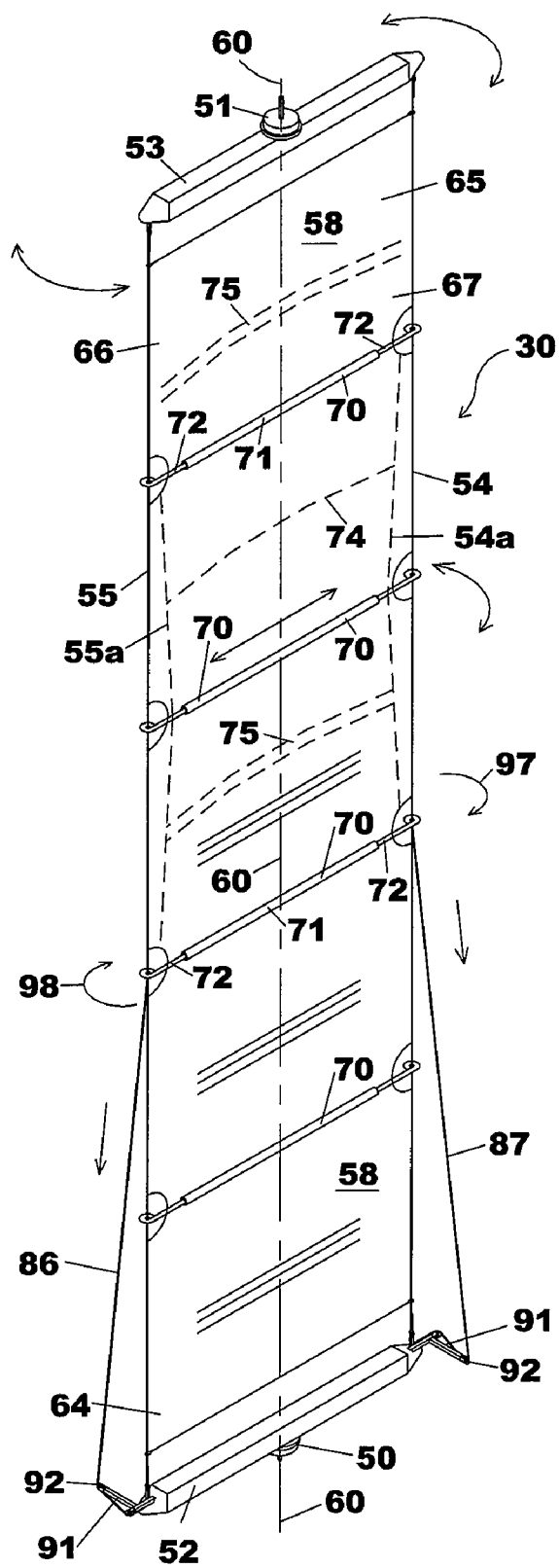
FIG. 9A is a perspective view of a sailwing assembly.
Figure 9B:
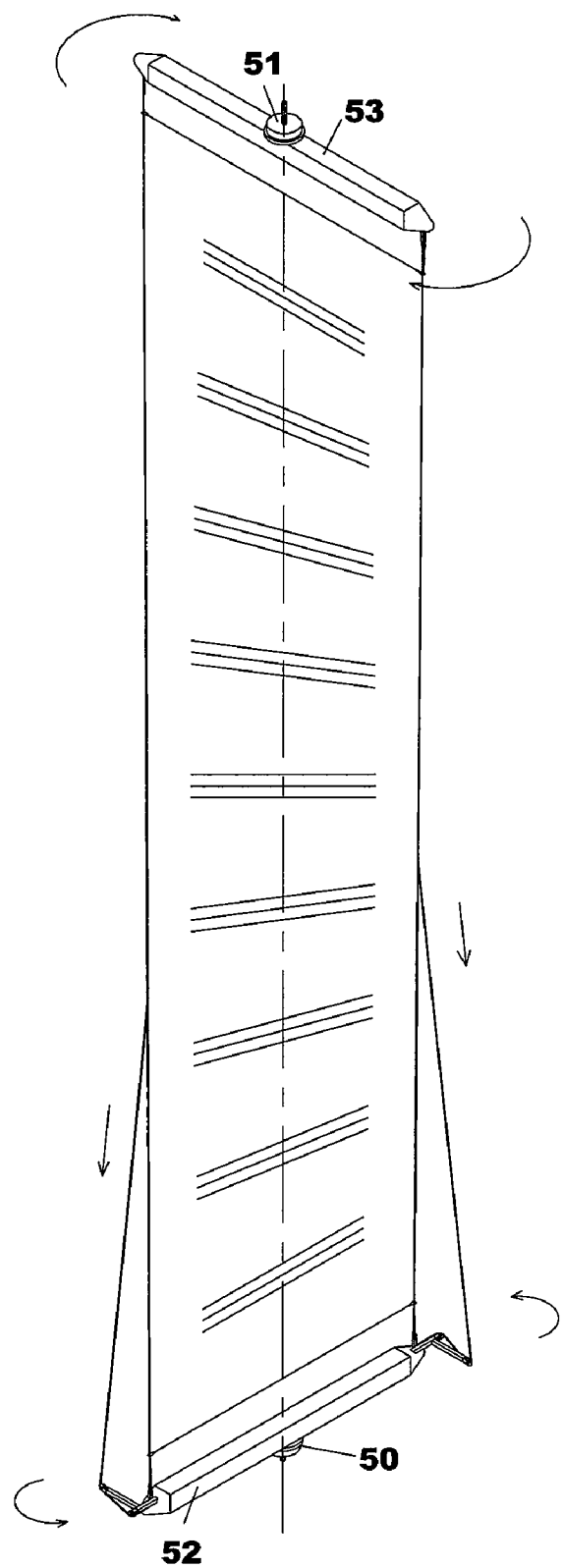
FIG. 9B is perspective view of a sailwing assembly, similar to FIG. 9A, showing how the end supports may be rotated with respect to each other to form a twist in the sail cloth.
Figure 9C:
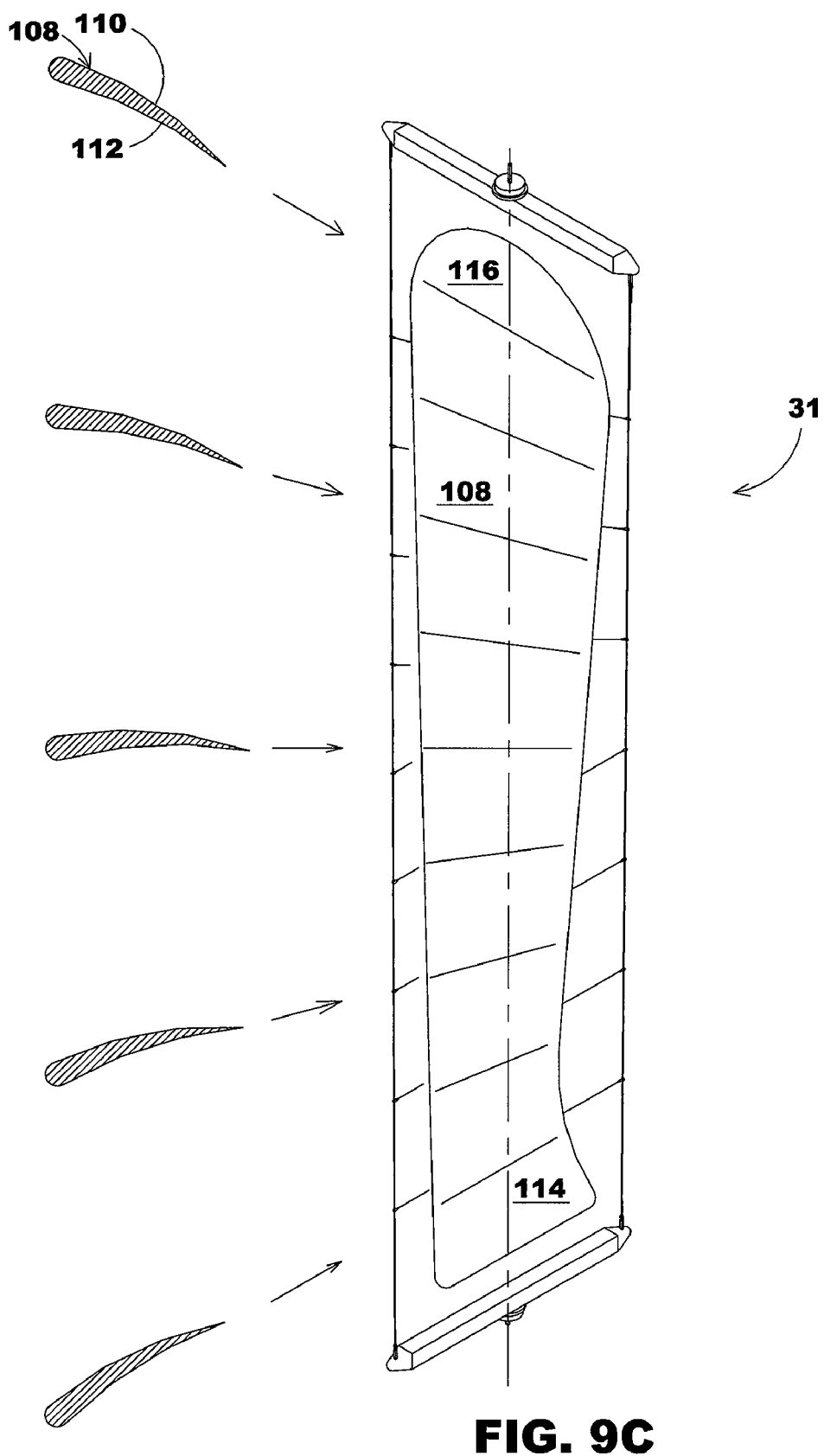
FIG. 9C is a perspective view of a sailwing assembly, similar to FIGS. 9A and 9B, but showing a more rigid sailwing that has a built in twist, and the relative wind across the surfaces of the sailwing.

As shown in FIG. 9A, the sail cloth has opposed inner and outer ends 64 and 65, opposed side edges 66 and 67, and a longitudinal axis 60. Since the sail cloth is flexible and usually assumes a loft in the wind, the longitudinal axis for the sail cloth is assumed to be the same for the sail cloth as for the slewing rings. The sail cloth 58 is supported at its opposed side edges by the sail support cables 54 and 55 by, for example, hems formed in the opposed side edges 66 and 67 slipped over the sail support cables 54 and 55. The support cables function as guys in that they support the edges 66 and 67 of the sailwing. Other support means for the opposed side edges 66 and 67 may be used, if desired.

As shown in FIG. 9A, one or more sail spreader bars 70 may be spaced along the sail cloth of the sailwing assembly 30. The sail spreader bars each have an elongated housing 71 and end connector rods 72. An electrically driven screw of conventional design (not shown) may be mounted inside the housing of one or more of the spreader bars for distending and retracting the end connector rods. The end connector rods 72 are reciprocally supported by the housing 71 so that the end connector rods may be distended outwardly or retracted inwardly. The end connector rods 72 are connected to the sail support cables 54 and 55. As shown midway of the height of the sailwing assembly 30 of FIG. 9A, the sail spreader bars 70 may retract their end connector rods 72 to pull the sail support cables 54 and 55 toward each other as indicated by dash lines 54A and 55A. The contraction of the sail support cables 54 and 55 toward each other allows more bow or "loft" of the sail cloth 58 as shown by the dash line 74. Therefore, it can be seen that wind movement past the sailwing assemblies forms the slack or "loft" in the sail cloth that generally conforms to the shape of an airfoil.

While the spreader bars 70 are illustrated as having cylindrical housing 71, the design of the spreader bars may have a housing connected to one sail support cable 54 or 55 and an end connector bar connected to the opposite support cable 55 or 54. For example, expansible cylinder and rod devices are disclosed in a catalog on the web site at www.joycedaton.com, page 29 and on pages 95-108 and pages 166-167.

The sail cloth may also include laterally extending pockets 75 sewn in them for receiving flexible rods that function to control the shape of the sail cloth. The flexible rods in the pockets function as "battens" for helping to control the shape of the sail cloth.

As shown in FIG. 10, the wind forms a loft 78 in the sail cloth 58, with a convex outer surface 76 on one side of the sail cloth and a concave inner surface 77 on the other side of the sail cloth. As shown by the wind direction diagram, the direction of movement of the sailwing assembly 30 of the wind turbine is indicated by the direction line WT, the direction of the wind is shown by the line W, and the direction of the relative wind is shown by the line RW. The relative wind RW passing over the convex surface 76 of the sail cloth tends to "lift" the sail cloth and urge it to move in the direction WT. In the meantime, the relative wind also engages the inside or concave surface 77 of the sail cloth, tending to push the sail cloth in the direction of the vector WT. Thus, the relative wind causes not only the loft 78 in the shape of the sail cloth but also induces a force against the sail cloth that causes the sailwing assemblies to rotate about the axle structure 28 (FIG. 3).

The direction of the relative wind changes along the length of the sailwing assemblies 30 because for a given rate of rotation of the sailwing assemblies the speed of the relative wind is greater near the outer portions of the sailwings than near the inner portions of the sailwings. Therefore, it is desirable to form the sail cloths with a variable pitch along their longitudinal axis, with a shallower pitch at their outer ends.

As shown in FIGS. 7 and 8, the sail end supports 52 are "torpedo shaped" and include an outer housing 80 that may be square in cross section with dome-shaped ends. The outer housing 80 is mounted to the slewing ring 50 and the motor 62 rotates the slewing ring and the sail end support 52 about the longitudinal axis 60 of the sailwing assembly. Tiedowns 82 are connected to the housing 80 of the sail end support 52, and the sail support cables 54 and 55 are connected to the tiedowns. Therefore, when the motor 62 rotates the slewing ring 50, thereby resulting in rotation of the sail end support 52, the adjacent ends of the sail support cables rotate in the same direction, resulting in a twist or pitch in the sail cloth 58 extending out toward the outer sail end support 53. Both the inner sail end support and outer sail end support function in this manner.

The inner sail end supports 52 include, in addition, trim cables 86 and 87 (FIG. 9A) and motors 88 and 89 (FIG. 8) that pay out or pull in the trim cables. An extension arm 91 extends at a right angle from each end of the sail end supports 52, with the extension arms 91 directed in opposite directions. As shown in FIGS. 7 and 9A, the extension arms form an L-shape with respect to the length of the outer housing 80 of the sail end supports 52 and guide pulleys such as end guide pulleys 92 form an L-shaped guide extension for the trim cable 86 and 87. The trim cables 86 and 87 extend from the distal ends of the guide extensions 91 up a portion of the length of the sail support cables 54 and 55 and connect to the sail support cable.

As shown in FIG. 9A, when the motor 88 attached to the trim cable 86 and/or the motor 89 attached to the trim cable 87 are actuated, the expansion or contraction of the motors 88 and 89 changes the effective lengths of the trim cables and forms a twist in the mid-portion of the sail cloth. This causes the mid sections of the sail support cables 54 and 55 to rotate laterally as shown by arrows, and forms a more twist in the outer portion of the sail cloth than in the inner portion of the sail cloth.

FIG. 9B shows the twist in a sail cloth when the sail end supports 52 and 53 of a sailwing assembly 30 are pivoted out of alignment with each other.

FIG. 9C shows a sailwing assembly 31 that includes a stiffer material of the sailwing 108 than the sail cloth 58 of the previous figures. For example, the material of the sailwing 108 may be formed in a shape that is more similar to a propeller or a wing of an aircraft, in that it may include an airfoil with opposed convex and concave surfaces 110 and 112, respectively. The thickness of the sailwing 108 may be substantially constant from inner end 114 to the outer end 116 since it is supported at both ends and does not require additional thickness for strength at its inner end to withstand the cantilever forces applied by the wind to a blade that has its support only at one end. The sailwing 108 may be fabricated of fiberglass or like composite, in a thickness and flexibility that is self supporting but may allow its shape to be bent in response to the forces applied to it, such as by the sail end supports 52 and 53 and by the sail support cables 54 and 55, and also by the forces of the wind. The flexibility of the sailwings 108 allows them to be bent to assume the desired twist compatible with the relative wind to be caught by the sailwings.

As shown in FIG. 11, there is a different configuration for the sailwing assembly 130, in that the sail cloth 132 may be formed in a continuous loop and supported by the sail support cables 134 and 135. A cylindrical tube 136 surrounds sail support cable 135 and the sail cloth extends about the tube so that the tube helps to form a leading edge 138 of the sail cloth 38 in a more rounded configuration, generally compatible with the curvature of a traditional airwing. The trailing edge 140 of the sail cloth 132 is connected to the sail support cable 134 as previously described.

The cylindrical tube 136 forms a spar inside the sail cloth and it is desirable that the cylindrical tube 136 be flexible so that it may bend in response to the twisting forces applied to the sailwing assembly 130 by the sail end supports and the spreader bars, as previously described.

FIG. 12 shows a modified form of the wind turbine. The wind turbine 150 includes a turbine wheel 152 that is formed with concentric wing support rings, intermediate ring 154 and outer ring 156. The intermediate ring and the outer ring may be made with angle braces as previously described and they are concentric with respect to the axis of rotation 158 of the turbine wheel.

Inner and outer sets of sailwing assemblies 160 and 162 are supported by the intermediate and outer rings 154 and 156 and the axle structure 164. The inner set of sailwing assemblies 160 is shown as having five sailwing assemblies 166 while the outer set of sailwing assemblies is also shown as having five sailwing assemblies 168. The sailwing assemblies 166 and 168 are aligned radially. If desired, the sailwing assemblies of one set may be offset with respect to the other sailwing assemblies, and there may be more outer sailwing assemblies than the inner sailwing assemblies. Also, the wind turbine of FIGS. 12-14 may not include the inner sailwing assemblies 166. The sailwings of FIG. 12 may be formed of sail cloth or of the stiffer self supporting material of FIG. 9C.

Each sailwing assembly 166 and 168 may be formed and constructed substantially as described above, including slewing rings, sail end supports, sail support cables, sail cloths, semi-rigid sailwings, and other connected elements.

An advantage of the concentric arrangement of sailwing assemblies of FIG. 12 is that larger turbine wheels may be constructed so as to provide more power to the driven apparatus, such as to several electrical generators. Also, the outer sailwing assemblies 168 may be rotated to a more shallow angle of attack with respect to the oncoming wind than the angle of attack of the inner sailwing assemblies 166, or vice versus as may be desired.

Since the electric motors such as motors 62, 71 and 88 are mounted on the turbine wheel and rotate with the turbine wheel, the motors may be actuated while the turbine wheel is rotating. Thus, the shapes of the sailwings may be made "on the fly." Also, a computer program may be developed to actuate the motors that change the configuration of the turbine wheel in response to detecting changing conditions, such as changing the shapes of the sailwings in response to changes in atmospheric conditions, in response to varying electrical loads on the generators and in response to other varying conditions. This can be done while the turbine wheel is in motion.

It will be understood by those skilled in the art that while the foregoing description sets forth in detail preferred embodiments of the present invention, modifications, additions, and changes might be made thereto without departing from the spirit and scope of the invention, as set forth in the following claims.

The invention claimed is:

1. A wind turbine comprising:
an upwardly extending support,
a turbine wheel rotatably mounted on said support about a laterally extending central axis,
a plurality of sailwing assemblies carried by said turbine wheel, said sailwing assemblies each including:
a sail cloth having opposed inner end and outer end, opposed side edges, and a longitudinal axis extending between said inner end and said outer end and extending radially from said central axis,
support cables extending substantially parallel to said longitudinal axis of said sail cloth and positioned adjacent and supporting said opposed side edges of said sail cloth,
shape control means for adjusting the attitude and shape of the sail cloth, said shape control means including sail end supports attached to said opposed inner and outer ends of said sail cloth for rotating said opposed ends of sail cloth independently of each other and imparting a longitudinal twist to the sail cloth,
sail spreader bars positioned at intervals between said opposed ends of said sail cloth and attached at intervals along said support cables for adjusting the distance between said support cables and adjusting the loft of the sail cloth, and
trim cables extending from said sail end supports to said support cables for adjusting the configuration of said sail cloth.

2. A wind turbine comprising:
a support,
a turbine wheel rotatably mounted on said support about a laterally extending central axis,
said turbine wheel including an outer perimeter rail rotatable about said laterally extending central axis, and a central axle structure at said laterally extending axis,
at least three sailwing assemblies carried by said outer perimeter rail of said turbine wheel extending at equal angles from one another,
said sailwing assemblies each including a sailwing with an inner end at said central axle structure and an outer end at said outer perimeter rail and a longitudinal axis extending between said inner end and said outer end and extending radially from said central axis,
shape control means carried by said turbine wheel for rotating both of said inner end and said outer end of each sailwing with respect to each other about said longitudinal axis of the sailwing for varying the twist of the sailwing,
said outer perimeter rail supporting said shape control means for said outer ends of said sailwings,
cables extending radially from said axle structure to said outer perimeter rail for supporting said outer perimeter rail from said axle structure, and
at least one electrical generator in driven relationship with said outer perimeter rail for generating electricity in response to the rotation of said outer perimeter rail about said central axis structure.

3. The wind turbine of claim 2, and wherein said sailwing assemblies each include a sailwing cloth, wherein said shape control means includes sail end supports at said inner end and at said outer end of said sailwing assembly and connected to said sailwing cloth and configured for rotating said sailwing cloth at said inner ends and said outer ends of said sailwing assemblies.

4. The wind turbine of claim 3, and wherein said shape control means includes at least one motor connected between said turbine wheel and said sail end supports for rotating said sail end supports with respect to said turbine wheel.

5. The wind turbine of claim 4, and wherein said at least one motor is configured to pivot the sail end supports with respect to each other for forming a twist in said sailwing cloth.

6. The wind turbine of claim 2, and wherein
said sailwing assemblies each include a sailwing cloth,
said shape control means includes sail spreader bars positioned at intervals about said sailwing cloth for adjusting the curvature of the sailwing cloth, and
sailwing end supports mounted to said turbine wheel and connected to said sailwing cloth for independently rotating said sailwing cloth to form a twist in said sailwing cloth.

7. The wind turbine of claim 2, and wherein said sailwing assemblies each include:
a sail cloth having opposed side edges,
a pair of guys extending from said inner end to said outer end of the sailwing assemblies, and
said guys suspending said opposed side edges of said sail cloth and for forming a loft in the sail cloth of said sailwing assemblies in response to wind passing said sailwing assemblies.

8. The wind turbine of claim 7, wherein said guys include a spar, and said sail cloth is supported on at least one of its said opposed edges by said spar.

9. The wind turbine of claim 7, wherein said guys comprise cables.

10. The wind turbine of claim 7, wherein said guys comprise spars.

11. The wind turbine of claim 2, wherein said sailwing assemblies carried by said turbine wheel comprise:
a sail cloth having opposed substantially parallel edges,
guys extending parallel to said opposed substantially parallel edges, said shape control means connected to said guys and configured to move said guys with respect to each other for changing the shape of the said sail cloth.

12. The wind turbine of claim 2, and wherein said shape control means carried by said turbine wheel for rotating said inner end and said outer end of the sailwing assemblies about said longitudinal axis to change the angle of the sailwings comprises sail end supports connected to the opposed ends of said sailwing cloth, and end support actuators mounted to said turbine wheel to turn said sail end supports.

13. The wind turbine an of claim 2, and further including a stator positioned adjacent said turbine wheel and a rotor actuated by said turbine wheel in registration with said stator for generating electricity in response to the rotation of said turbine wheel.

14. The wind turbine of claim 2, wherein said sailwings are formed of fiberglass and are of substantially constant thickness along their lengths.

15. A wind turbine including a turbine wheel, said turbine wheel including a perimeter rail with a central axis of rotation and a plurality of sailwings extending radially within said turbine wheel between said central axis of rotation and said perimeter rail,
each of said sailwings including an outer end and an inner end, said outer end extending radially from said inner end,
and
each of said sailwings including an inner and outer shape control means, said inner shape control means mounted in said turbine wheel at said central axis of rotation and said outer shape control means mounted to said perimeter rail for rotating both said inner end and said outer end with respect to each other to form a varied pitch in each of said sailwings.

16. The wind turbine of claim 15, wherein said shape control means includes means for pivoting said sailwings as the turbine wheel rotates.

17. The wind turbine of claim 15, wherein said plurality of sailwings extending radially within said turbine wheel comprise an inner ring and an outer ring of sailwings.

* * * * *